Aug. 4, 1953  R. D. PIKE  2,647,822
NITRIC OXIDE RECOVERY SYSTEM
Filed April 13, 1948
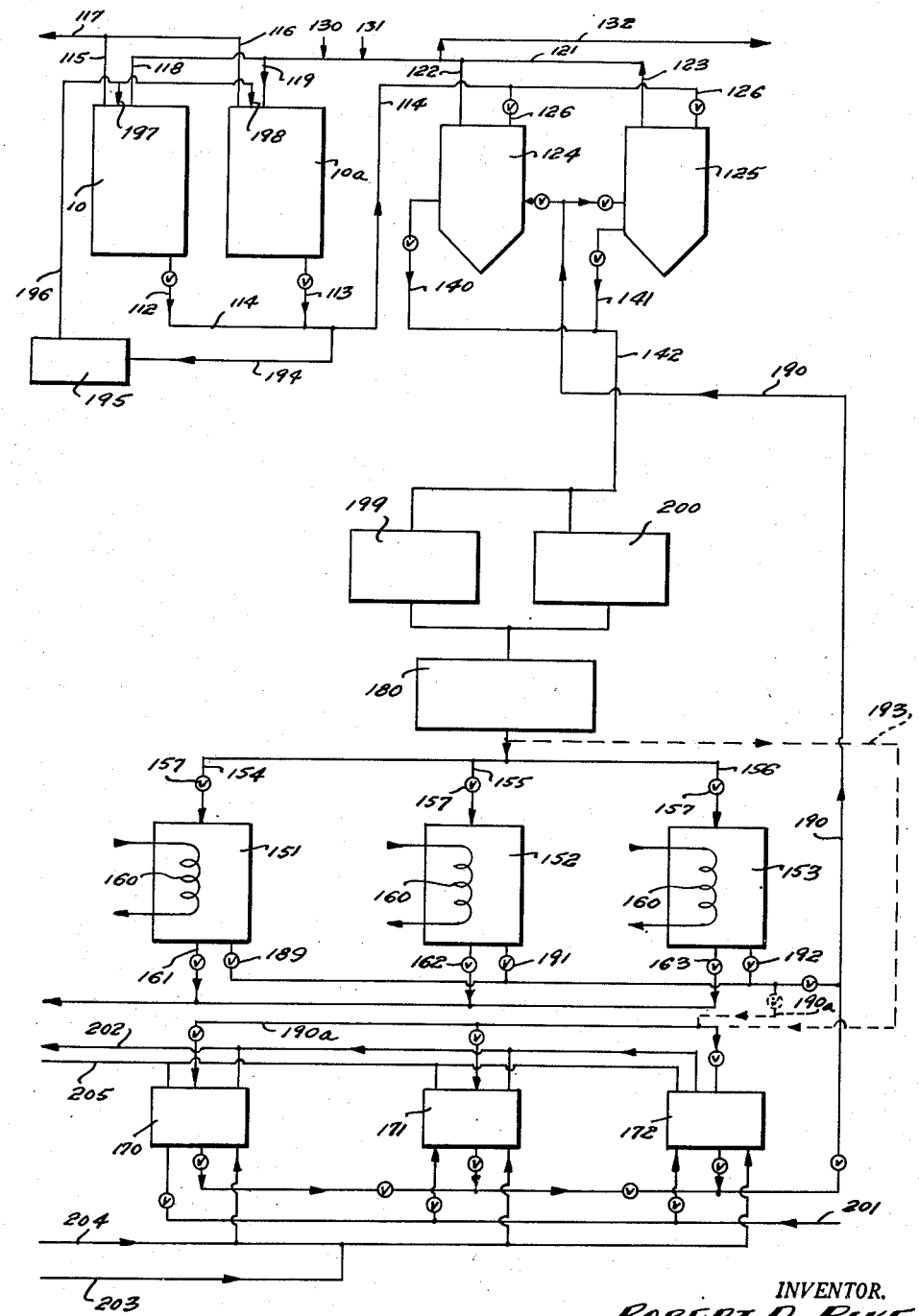
INVENTOR.
ROBERT D. PIKE
BY
ATTORNEYS Patented Aug. 4, 1953

2,647,822

UNITED STATES PATENT OFFICE 2,647,822

NITRIC OXIDE RECOVERY SYSTEM

Robert D. Pike, Greenwich, Conn.

Application April 13, 1948, Serial No. 20,672

7 Claims. (Cl. 23—161)

1

This invention relates to a system and apparatus for the recovery of nitric oxide from gaseous mixtures containing nitric oxide in small amounts.

In the manufacture of nitric oxide by the reaction of nitrogen and oxygen at high temperature in fuel fired or electrically heated furnaces, the amount of nitric oxide in the furnace discharge gases is relatively low, usually of the order of 0.5% to 4.6% and the efficient recovery of the nitric oxide in this dilution from the furnace gases is an important factor in the economical operation of any such nitric oxide manufacturing operation.

The system and apparatus for the recovery of nitric oxide which is described herein is designed primarily for use with the Method of Making Nitric Oxide, described in my copending application Serial No. 786,972, filed November 19, 1947, now Patent 2,643,937. It is especially adapted for the recirculation of oxygen in a process in which an equimolal mixture of oxygen and nitrogen is passed through the nitric oxide furnaces. It can be used, however, for the recovery of nitric oxide from any gaseous mixture containing the same.

One of the objects and advantages of my invention is to provide a method and apparatus for the recovery of nitric oxide from furnace or other gases containing the same, which will be more efficient and more economical than the methods heretofore used.

Another object of my invention is to combine refrigeration with silica gel or other absorption of the nitric oxide in such a way as to reduce the load on the silica gel or other absorption beds and to prolong their effective use and efficiency.

Another object of my invention is to remove by refrigeration as much as possible of the nitric oxide from the furnace gases before passing the gases to a silica gel or other absorption system.

Another object is to recover and recirculate the oxygen containing gases after the removal of nitric oxide therefrom.

Various other objects and advantages of my invention will be apparent as this description proceeds.

Referring now to the drawings which illustrate in diagrammatic form one embodiment of my invention, 10 and 10a illustrate two furnaces of the type described in greater detail in my copending application Serial No. 786,972, now Patent 2,643,937, from which gases containing nitric oxide in amounts up to 4.6% are discharged into my recovery system. It will be understood,

2 however, that the nitric oxide containing gases may be received from any source or any furnace other than the furnaces illustrated at 10 and 10a.

The gases discharged from two furnaces 10 and 10a are led by the conduits 112, 113, into a single conduit 114 leading to the recovery system. At their tops the furnaces 10 and 10a are connected through conduits 115, 116, to a single discharge stack 117 into which the products of combustion are discharged on the upstream or heating phase of the furnace cycle. These two furnaces are also connected by means of conduits 118, 119 to a single conduit 121, which in turn connects by means of conduits 122, 123, to the tops of two pebble beds 124, 125, mounted in suitable chambers and receives the recycled gases from these pebble beds. These pebble beds are connected to conduits 126 supplied by conduit 114, already referred to.

When operated at a temperature of 4577° F., as described in my previous application Serial No. 786,972, now Patent 2,643,937, the two furnaces 10 and 10a together yield a continuous stream of gas containing approximately 2.8% nitric oxide when fed with air on downstream operation and when receiving on downstream operation an equimolal mixture of nitrogen and oxygen the nitric oxide content of the furnace discharge gases will be 4.6%. When operated on an equimolal mixture of oxygen and nitrogen, the oxygen containing gas discharged from the recovery system through the line 190 is recycled through one or the other of the heat exchange pebble beds 124, 125, and returned to the furnaces 10 or 10a through the line 121. Make up oxygen and air necessary to maintain the desired equimolal mixture of oxygen and nitrogen may be added through conduits 130 and 131, respectively. The recycled mixture enters the furnaces 10 and 10a through the conduits 118 and 119, respectively. When operating in a closed system with an equimolal mixture of oxygen and nitrogen, approximately 5% of the total recycle flow is removed from the conduit 121, into a conduit 132 and discarded. This bleed of about 5%, which is discarded is sufficient to maintain the concentration of the rare gases of the atmosphere (mostly argon) in the recycled gases at not above 6.5% by volume. The gases on the upstream or heating cycle in the furnaces 10 and 10a are gases of combustion substantially barren of nitric oxide and are wasted to the stack 117 in the manner more completely described in said copending application.

The nitric oxide containing gases which are recirculated through the furnaces 10 and 10a for the purpose of quickly chilling the freshly formed nitric oxide as described in said copending application are removed from the line or conduit 114 through line 194 and thence passed through a cooler 195 and back to the top of furnaces 10 and 10a.

The cooler 195 may be of any desired type to cool the gas from the average temperature of about 500° F. at which it leaves the furnaces to about 100° F. except that if an anhydrous cycle be used for collection, no water may be brought into contact with the gas. The nitric oxide containing gas from the cooler 195 enters the annulus of the downstream furnace 10 or 10a through line 196 and lines 197 and 198.

The nitric oxide containing gas leaving the furnaces 10 and 10a through the conduits 112 and 113, at an average temperature of about 500° F., after removal of the portion fed to the furnace annulus through the line 194, as just described, is led to one or the other of the two pebble bed heat exchangers 124, 125 through conduit 114 where it transfers its heat to the pebbles and leaves one or the other pebble bed chamber at about 120° F. through the conduit 140 or 141, both of which lead to a conduit 142, which conveys the cool gas to the collecting system.

From the line 142, the cooled furnace gases first pass through one or the other of the refrigerating chambers 199, 200. These are provided with suitable cooling surfaces to cool the gas to about 25° F. at which temperature any appreciable amount of contained water will be frozen out. Should frost deposit on the refrigerating surface of the chamber in use, sufficiently to impair the transfer of heat, that chamber can be taken off the line and defrosted while the other is being used.

A principal advantage of the refrigeration provided in chambers 199, 200, is to prepare the gas for passing through the silica gel bed in chamber 180, the function of which is to catalytically oxidize nitric oxide to nitrogen peroxide. This must be done in the absence of water vapor which otherwise would be adsorbed by the silica gel, thus impeding its action. The low temperature of the gases and of the silica gel bed will also assist in the oxidation of the nitric oxide to nitrogen peroxide. In this operation the bed of silica gel becomes rapidly saturated with nitrogen peroxide by adsorption and continues to act as a catalyst for the nitric oxide which passes through the bed thus:

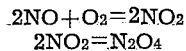
$$2NO + O_2 = 2NO_2$$
$$2NO_2 = N_2O_4$$

Only one chamber 180 has been illustrated but after protracted running it may be necessary to revive the gel by passing steam or hot air through it to remove nitrogen peroxide. If steam be used the gel must be dried and then revived by the passage of cold air. If hot air be used it will only be necessary to revive the gel by the passage of cold air. A second bed 180 may be provided.

Most of the nitrogen peroxide can be removed from the gas by cooling to a sufficiently low temperature. For example, I may pass the gas from the oxidizing chamber 180 through conduits 154, 155 or 156, which are controlled by valves 157, into one or the other of the refrigerating chambers 151, 152, 153, each of which is supplied with a suitable refrigerating coil 160 to reduce the temperature of the gas to about 0° F. or even lower. As $N_2O_4$ solidifies about 13.75° F. solid nitrogen peroxide will deposit on the refrigerating surface of the vessel in use and this must occasionally be taken off the line and pure gaseous or liquid nitrogen peroxide removed and recovered by raising the temperature. Liquid nitrogen peroxide can be collected under pressure in suitable containers by withdrawing through the lines 161, 162, 163. During this interval, one of the other refrigerating containers will be in use, the third being prepared for use.

The remaining gas containing a high percentage of oxygen and thus depleted of its nitrogen peroxide by refrigeration and at a low temperature, may be recycled directly to the pebble beds 124 or 125 and thence to the furnaces 10, 10a via line 190 which is connected to the refrigerators through lines 189, 191, 192; or it may be alternately treated by first passing it through line 190a to a silica gel adsorption system in which the chambers 170, 171, 172, hold beds of silica gel. One of these chambers will be in use while the second is being desorbed and the third revived. A fourth, not shown, may be provided to assist in continuous operation. After passing through the bed of silica gel, the remaining gas containing a high percentage of oxygen will be returned to 190 and thence recycled back to the furnace.

The cold gas recycling back from the collecting system at a temperature of as low as 0° F. through line 190 flows through the pebble bed which is not receiving furnace gases from the conduit 114 extracting heat from the pebble bed and emerging through lines 122 or 123, enters line 121 at a temperature of approximately 370° F. After mixing in the makeup oxygen and air, from the lines 130 and 131 to provide the equimolal mixture of oxygen and nitrogen, the temperature of the gas actually redelivered to the furnaces is about 330° F.

In the silica gel adsorption system, in that chamber which is in use, the nitrogen peroxide remaining in the gas after refrigeration, is adsorbed on the silica gel up to the limit of its capacity. This chamber is then taken off the line and preferably desorbed by passing live steam through the bed, using line 201. This drives the nitrogen peroxide off as a pure gas through line 202, which may be compressed and collected in suitable containers. The bed of silica gel having been desorbed the next step is to dry it with warm air, supplied by line 203, and restore it to its original active condition by bringing it to a lower temperature by pasing cold air through it, from the line 204. The air issuing from the top of the silica gel beds, after it is used is removed through the line 205.

By using the line 193, I may if I desire by-pass the refrigerators 151, 152, 153 and send the oxidized gas direct to the silica gel adsorption plant.

In the process described, I may use the refrigeration in chambers 151, 152, 153 without the silica gel beds 170, 171, 172 for the recovery of the nitrogen peroxide, but I prefer to use refrigeration in series with silica gel adsorption. Refrigeration is useful for two purposes, it removes the bulk of the nitrogen peroxide and the remaining small amount of nitrogen peroxide is readily adsorbed in a small silica gel system with great efficiency because of the low temperature prevailing. Thus refrigeration and silica gel adsorption when used in series, considerably increase the efficiency of collection.

I may also operate refrigerators 151, 152, 153 so as not to reduce the gas below the freezing point of $N_2O_4$, holding the same at a temperature ranging from 15° to 20° F. to condense the $N_2O_4$. By so doing I avoid the necessity for removing solid $N_2O_4$ from the cooling surfaces and at the same time retain much of the advantage of refrigerating the gas to a low temperature before passing it into the silica gel adsorbers.

Where the furnaces 10 and 10a are operated on air instead of an equimolal mixture of oxygen and nitrogen, the recycle gases flowing back through the line 190 to the pebble bed 124 or 125 may be discharged to the atmosphere after they have been used to cool the pebble bed.

While I have illustrated and described a preferred embodiment of my system and apparatus for the recovery of nitric oxide from gaseous mixtures containing small amounts of nitric oxide, it will be understood that various modifications and changes may be made from the system and apparatus illustrated without departing from the spirit of my invention or the scope of the claims thereto.

I claim:

1. The method of recovering nitric oxide produced by the reaction of nitrogen and oxygen in a furnace at high temperature from gases containing the same in small concentration, which comprises cooling the nitric oxide containing gases to temperatures below 32° F., passing the cooled gases through silica gel to convert the nitric oxide to nitrogen peroxide, removing the nitrogen peroxide containing gases from the silica gel, further cooling the gases to remove nitrogen peroxide therefrom, recovering the nitrogen peroxide so removed, and recirculating the gases freed from nitrogen peroxide for heat exchange to cool warm furnace exit gas.

2. The method of recovering nitric oxide produced by the reaction of nitrogen and oxygen in a furnace at high temperature from gases containing the same in small concentration, which comprises cooling the nitric oxide containing gases to temperatures below 32° F., passing the cooled gases through silica gel to convert the nitric oxide to nitrogen peroxide, removing the nitrogen peroxide containing gases from the silica gel, further cooling the gases to condense nitrogen peroxide therefrom and recovering the nitrogen peroxide so condensed, passing the remaining gases through further silica gel to recover additional nitrogen peroxide therefrom, and recirculating the gases freed from nitrogen peroxide and nitric oxide for heat exchange to cool warm furnace exit gas.

3. The method of recovering nitric oxide produced by the reaction of nitrogen and oxygen in a furnace at high temperature from gases containing the same in small concentration, which comprises cooling the nitric oxide containing gases to temperatures below 32° F., passing the cooled gases through silica gel to convert the nitric oxide to nitrogen peroxide, removing the nitrogen peroxide containing gases from the silica gel, further cooling the gases to deposit solid nitrogen peroxide therefrom and recovering the nitrogen peroxide, passing the remaining gases through further silica gel to recover additional nitrogen peroxide therefrom, recirculating the gases freed from nitrogen peroxide to said furnace, and removing and discarding about 5 per cent of the recirculated gases.

4. In a closed system for the recovery of nitric oxide and oxygen from gases produced by the reaction of nitrogen and oxygen in a furnace at high temperature, which system includes the furnace and the recovery system, the steps which comprise cooling the gases from the furnace by refrigeration to temperatures below 32° F., then oxidizing the nitric oxide content of the gas by passing the gas through silica gel to convert the nitric oxide to nitrogen peroxide, removing the nitrogen peroxide by converting the same to a solid by refrigeration, recovering the nitrogen peroxide, recovering the remaining gas containing oxygen, recirculating said remaining gas to said furnace and recovery system, and removing and discarding about 5 per cent of the recycled gas.

5. In a method of collecting nitric oxide from gases containing the same in small amounts, the steps which comprise cooling the nitric oxide containing gas by refrigeration to a temperature below 32° F. to remove the water therefrom, then oxidizing the nitric oxide content of the gas catalytically in the absence of moisture and converting the nitric oxide to nitrogen peroxide by passing through a bed of silica gel, removing the gas containing the nitrogen peroxide from the silica gel, depositing solid nitrogen peroxide from the gas by refrigerating the gas, recovering the nitrogen peroxide, and passing the remaining gas through silica gel to adsorb the remaining nitrogen peroxide therefrom.

6. The method of recovering nitric oxide from gas containing the same in relatively small concentration produced by the reaction of nitrogen and oxygen in a furnace at high temperature yielding a gas containing NO, leaving the furnace at a moderate temperature, which comprises, cooling the NO containing gas first by heat exchange with cold barren gas returned from the collecting system, then further by refrigerating to a temperature below 32° F. whereby substantially all contained water vapor will be deposited and removed, then passing the gas through silica gel under the continued influence of refrigeration to maintain its low temperature and to catalytically oxidize the NO to $NO_2$, then passing the gas containing the latter compound through a silica gel bed for its adsorption while still under the influence of refrigeration to maintain a temperature below 32° F. whereby substantially all of the $NO_2$ is adsorbed by the silica gel, returning the cold barren gas to the furnace system for aforesaid heat exchange, removing the adsorbed gases by heating the silica gel, collecting the $NO_2$ and regenerating the silica gel for continued use.

7. The method of recovering nitric oxide from gas containing it in relatively small concentration, which comprises cooling the gas to a temperature less than 32° F. thereby removing substantially all of the contained moisture, then passing the gas through silica gel under the continued influence of refrigeration to maintain its temperature at less than 32° F. and to catalytically oxidize the NO to $NO_2$, then passing the $NO_2$ containing gas through a silica gel bed for adsorption of $NO_2$ while still under the influence of refrigeration to maintain its low temperature, whereby substantially all of the $NO_2$ is adsorbed by the silica gel, recovering the $NO_2$ thus adsorbed by heating the silica gel, collecting the $NO_2$ and regenerating the silica gel for continued use.

ROBERT D. PIKE.

(References on following page)

References Cited in the file of this patent

UNITED STATES PATENTS

| Number | Name | Date |
|---|---|---|
| 1,032,782 | Schonherr et al. | July 16, 1912 |
| 1,057,052 | Guye | Mar. 25, 1913 |
| 1,335,348 | Patrick et al. | Mar. 30, 1920 |
| 1,339,494 | Burdick | May 11, 1920 |
| 1,348,227 | La Cour | Aug. 3, 1920 |
| 1,547,714 | Andriessens | July 28, 1925 |
| 1,610,288 | Jones et al. | Dec. 14, 1926 |
| 1,735,342 | Taylor et al. | Nov. 12, 1929 |
| 1,948,968 | Kramer | Feb. 27, 1934 |
| 1,949,462 | Fogler | Mar. 6, 1934 |
| 2,135,733 | Richardson | Nov. 8, 1938 |
| 2,309,919 | Reed | Feb. 2, 1943 |
| 2,422,081 | Cottrell | June 10, 1947 |
| 2,578,674 | Daniels et al. | Dec. 18, 1951 |

FOREIGN PATENTS

| Number | Country | Date |
|---|---|---|
| 6155 of 1908 | Great Britain | July 2, 1908 |
| 168,651 | Great Britain | Sept. 2, 1921 |
| 211,845 | Great Britain | Feb. 26, 1925 |
| 455,734 | Great Britain | Oct. 27, 1936 |
| 519,082 | Great Britain | Mar. 15, 1940 |